Figure 1:
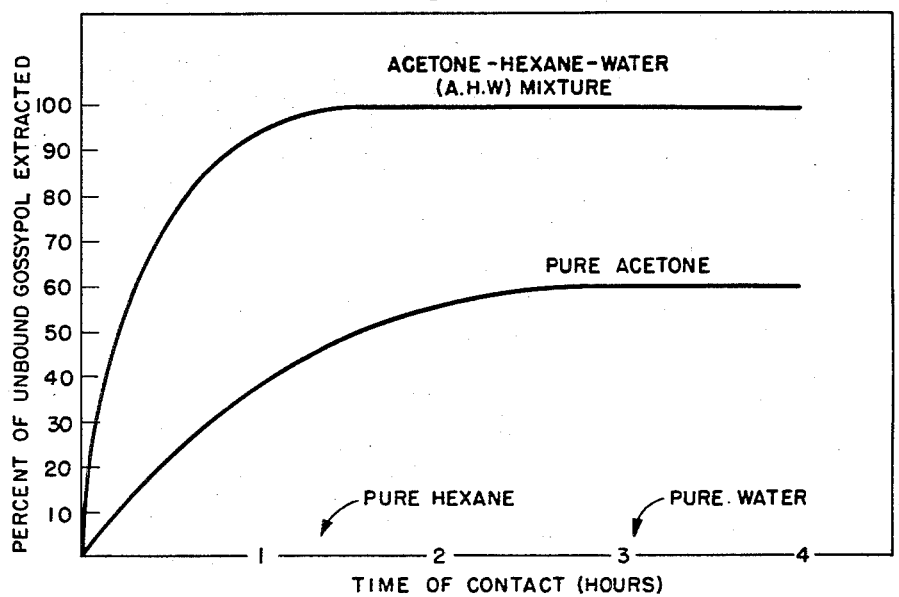

Aug. 23, 1960 W. H. KING ET AL 2,950,198
PRODUCTION OF COTTONSEED MEAL OF IMPROVED QUALITY
Filed Sept. 29, 1959

INVENTORS
WILLIAM H. KING
VERNON L. FRAMPTON

BY

ATTORNEYS 2,950,198
PRODUCTION OF COTTONSEED MEAL OF IMPROVED QUALITY

William H. King and Vernon L. Frampton, Metairie, La., assignors to the United States of America as represented by the Secretary of Agriculture Filed Sept. 29, 1959, Ser. No. 843,312

1 Claim. (Cl. 99—2)

(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to a process for preparing raw, decorticated cottonseed meats for extraction, and for extraction of the oil and undesirable minor components therefrom in such a way as to prevent damage to the desirable native properties of the extracted meats.

Vegetable oilseeds are usually converted to oilseed meats, i.e., oilseed kernels substantially free of hulls before their oil is removed by means of pressure and/or solvents. Whether the oil is pressed out, or is removed by extraction with an oil solvent, the oilseed meats are usually subjected to a pretreatment to enhance the extractability of the oil and, in the case of cottonseed, to aid also in detoxification or inactivation of the gossypol contained in the cottonseed.

In general, the pretreatments are designed to increase the availability of the oil by improving the filtration and/or pressing characteristics of the meats. Ideally the pretreatment would convert the materials to porous solids, through which oil and oil solvents impregnated with oil in the form of a homogeneous oil phase, would flow with ease. In the case of cottonseed meats a more extensive pretreatment, designed to aid in the detoxification of gossypol, is often employed.

Most of the previously proposed pretreatments of cottonseed involve heating the oilseed meats, in the presence of at least the amount of moisture present in the natural seeds, to a temperature of at least 212° F. for at least about 30 minutes. Such "extensive cooking" pretreatments usually bring about the desired improvement in the filtration and/or pressing characteristics and, in the case of cottonseed meats, at least partially bind the gossypol to seed constituents. However, because of the high temperatures used the extensive cooking also causes an undesired reduction in the nutritive value of the meals that the meats will yield.

A primary object of the present invention is to provide a process for extraction of oilseed meats which avoids precooking, and which prevents denaturation and preserves the nutritive quality of the native oilseed protein.

A second object of the invention is to provide a process which accomplishes extraction of the oil and gossypol and related pigments from raw cotonseed meats in one extraction operation. In this way the gossypol is extracted along with the oil from which it may be removed by refining of the solvent-oil miscella or by refining of the recovered oil. The resultant extracted cottonseed meal is substantially free of this deleterious pigment and contains the protein in substantially the same form in which it occurs in nature.

Another object of the invention is to provide a low-boiling solvent mixture suitable for extracting both oil and gossypol pigments from uncooked cottonseed flakes in one extraction operation, which solvent mixture may be easily recovered in an essentially unchanged form from the miscella and marc.

Some of the advantages of the present process have been obtained in the past by multiple solvent extraction of cottonseed in a stepwise manner, by first extracting the flaked raw meats with a liquid hydrocarbon solvent, such as hexane, followed by desolventization of the meal and again extracting exhaustively with an aqueous polar solvent, such as aqueous butanone. Experience with this multiple solvent method has shown that, in addition to the added expense of two extractions, two desolventizing operations, and double solvent recovery, serious difficulty is encountered because of undesirable physical properties of the meats. When raw cottonseed flakes are extracted with the usual dry oil solvents the flakes disintegrate and become extremely fine and powdery, and the flour-like nature of the flakes presents very serious obstacles to extraction. Such a procedure is entirely impractical on a large scale. On the other hand, when aqueous polar solvents are used in direct solvent extraction of raw cottonseed meats, the poor solubility of the oil in such solvents also presents serious obstacles to the success of the extraction and, unless the composition of the recovered solvent is carefully controlled by efficient rectification during solvent recovery, such a procedure may be entirely unsuccessful. Under the usual commercial conditions of recovery of solvent from miscella, and in the equipment which is provided therefor, it is impossible to provide the rectification needed in the continuous operation of a process using such a solvent mixture.

In the course of an investigation to find a processing procedure for producing cottonseed meal of the highest quality from raw cottonseed, we discovered a suitable solvent and a procedure for its successful use in accomplishing the objectives described above, and which can be used under conditions which are practical on a large scale. Details of the process of the present invention are given in the subsequent description in the specification.

In carrying out the process of the present invention, delinted cottonseed are first hulled in conventional equipment, and the resultant hulled, that is, raw decorticated cottonseed meats, are segregated in the usual manner. The raw decorticated cottonseed meats are then adjusted to a moisture content of from about 10 to about 15% by weight at ambient temperature to put them in suitable condition for flaking. They are then flaked in conventional flaking rolls to thickness of from about 0.003 to about 0.010″. The moist flakes may be used without further adjustment of their moisture content, or they may be partially or completely air dried at a temperature not to exceed about 130° F. It is not desirable to employ higher drying temperatures because an undesired reduction in nutritive value of the cottonseed meal may result. In general, it is preferred to adjust the moisture content of the flakes to from about 7% to about 15%, at a temperature not to exceed about 130° F., for the subsequent solvent-extraction step of the present invention. When the flakes are to be extracted using the equipment and mechanical mode of operation as practiced in conventional "direct solvent extraction" of oilseeds, we prefer that the flakes be adjusted to a moisture content of about 12 to 15%. In those instances where it is desired to employ vacuum filtration equipment and procedures, as in the conventional "filtration-extraction" of oilseeds, the preferred moisture content of the flakes to be extracted is about 7% to 10% for optimum filtration characteristics.

Under the aforementioned conditions employed for preparing the cottonseed flakes for extraction, essentially none of the pigment glands of the meats are ruptured and consequently the gossypol does not intermix with and combine with other constituents of the meats to any great extent. However, the preparative steps produce raw cottonseed flakes having physical properties which allow the extraction solvent of the present invention to make intimate contact with the oil cells and pigment glands of the meats, thus permitting efficient extraction of both oil and pigments.

Following the above-described preparative steps, the so-prepared raw cottonseed flakes are extracted, at ambient temperature, with a homogeneous, constant boiling solvent mixture consisting of 53 parts by volume of acetone, 44 parts by volume of hexane, and 3 parts by volume of water. This solvent mixture, hereinafter referred to as the A.H.W. mixture, can be employed in conjunction with any of the types of extraction equipment and operational procedures commonly used in the solvent extraction of oilseed materials. Once the oil and pigments are dissolved in the A.H.W. mixture, the meats are washed free of oil- and pigment-bearing miscella with further portions of the same solvent mixture by one of the usual oilseed extraction procedures. As will be noted from the examples of application of the invention given below the only limitations on the completeness of extraction of pigments and oil by the A.H.W. mixture are in the mechanical methods of extraction used.

The commercial solvent normally used in processing cottonseed is a petroleum ether which contains a large proportion of hexane, and which boils in the range of 62° C. to 78° C. (140° F. to 170° F.), and with a median boiling point of about 70° C. For recovery of commercial petroleum ether from, and in desolventizing the solvent-damp "marc" (that is, the extracted cottonseed flakes still damp with solvent), temperatures considerably above the aforementioned boiling range are generally employed. These temperatures are sufficiently high to cause heat damage to the protein in the resultant meal. On the other hand, the A.H.W. mixture of the present invention boils within the narrow boiling range of 48°–52° C. (118°–125° F.) and it can be removed from the marc at a considerably lower temperature than that required for commercial petroleum ether. Consequently, there is less heat damage to the protein during desolventization when the A.H.W. mixture is used. The temperature employed for desolventization of the marc in the process of the present invention can be varied, depending on how high a nutritive value is desired in the finished metal. In general, temperatures not exceeding about 150° F. are preferred. Optimum results are obtained when the marc is desolventized by air-drying or vacuum drying at ambient temperature.

Due to the fact that the A.H.W. solvent mixture boils with essentially constant composition over its narrow boiling range, it can be recovered by distillation without change in composition and can be used repeatedly. Even when distilled by flash distillation, such as is practiced in the primary evaporators used in oil mills to recover solvent from the oil-solvent miscella from mixtures containing large quantities of water (e.g. 15% by volume), the distillate retains the 53–44–3 composition ratio. The same is true when oil and water are both added to the solvent mixture; the oil and excess water remain behind, and the distillate retains the 53–44–3 composition ratio. This is important in the instant process because cottonseed flakes of substantially any desired moisture content can be used in the extraction without recourse to special rectifying equipment in recovery of the solvent.

Another advantageous property of the 53–44–3% acetone-hexane-water mixture is that it is not a dehydrating solvent. In other words it does not remove water from moist cottonseed flakes since the solvent mixture is already saturated with moisture. Three percent by volume is the upper limit for solubility of water in the mixture. Thus, flakes conditioned at any desired moisture level to facilitate extraction remain moist when contacted by the A.H.W. mixture. Of course, other solvents, such as liquid hydrocarbons like commercial hexane, used alone do not dehydrate the flakes either. However, the presence of moisture in the flakes inhibits penetration of the flakes by such solvent; adequate contact with the oil is not established; and therefore very poor oil extraction from damp or wet flakes is obtained by this class of solvent. Acetone is a dehydrating solvent and will very readily dry out moist flakes causing them to crumble and produce fines during the extraction. In contrast, the A.H.W. mixture has the ability to rapidly penetrate into the wet meats and dissolve both the oil and the undesirable pigments. This solvent power and non-dehydrating property permits the ready extraction of cottonseed flakes without the production of troublesome fines which have heretofore prevented commercial extraction of raw cottonseed.

Furthermore, due to the fact that the flakes maintain their integral nature in the presence of the A.H.W. solvent, the flakes settle rapidly in the solvent mixture, and thus may be washed by decantation or countercurrent extraction in a completely closed system. This property makes possible an extraction procedure, exemplified by Example 1, employing countercurrent extraction of flakes by the solvent. In addition, because the large size of the flakes is maintained throughout the extraction, extraction by percolation and filtration techniques can also be readily effected as is shown in examples of application of the process which follow.

It is readily apparent, therefore, that raw cottonseed flakes of sufficient moisture content to prevent disintegration and to assure proper physical characteristics for efficient solvent extraction can be readily extracted with the A.H.W. solvent mixture of this invention. As mentioned earlier, the exact processing conditions used in practicing this invention will depend on the particular extraction equipment and mechanical method of extraction which the operator desires to employ.

Figure 2:
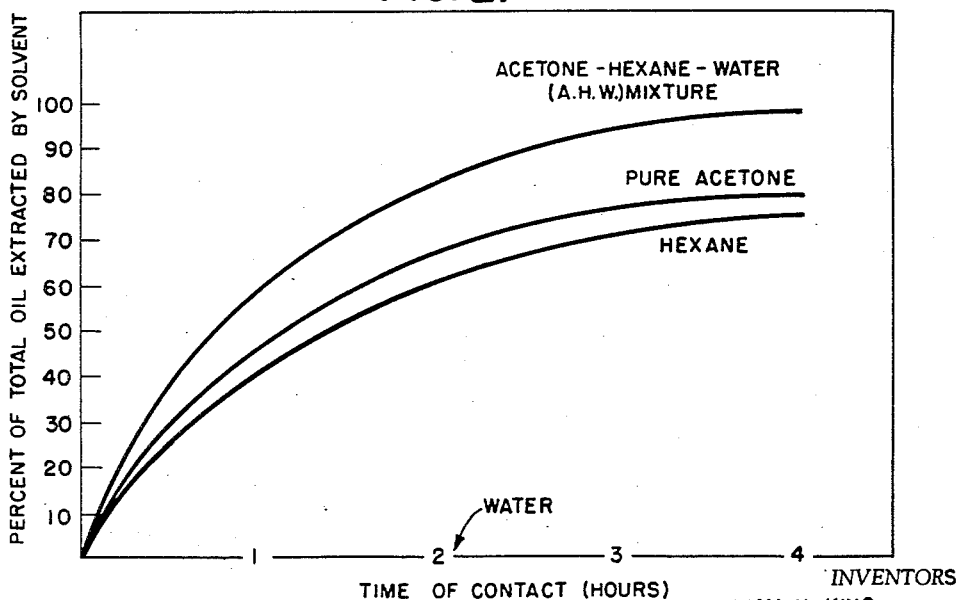

The decided superiority of solvent action of the A.H.W. mixture over that of the individual solvent components of the mixture can be clearly seen in Figures 1 and 2, which show the relative rates of extraction of gossypol and oil, respectively, from raw cottonseed flakes containing 10% moisture. The data presented in the two figures were obtained by contacting two parts by weight of the particular solvent with one part by weight of the flakes for the indicated times, then analyzing aliquots of the extracts for gossypol and oil by the usual procedures. The flakes used were prepared by flaking raw meats of 15% moisture content, followed by air-drying of the flaked meats at ambient temperature until they contained 10% moisture.

The following examples are illustrative of the details of at least one method of practicing the invention. The analytical values given in the examples were determined as follows: Free and total gossypol and oil content of the extracted meals were determined by the official methods of the American Oil Chemists' Society (American Oil Chemists' Society, "Official & Tentative Methods of Analysis," 2nd edition, revised to 1958, Chicago, 1946–1958); lysine was determined by the method of Edith J. Conkerton and V. L. Frampton (Archives of Biochemistry and Biophysics, volume 81, No. 1, pages 130–134, March 1959); and nitrogen solubility in 0.02 N sodium hydroxide by the method of C. M. Lyman, W. Y. Chang and J. R. Couch [J. Nutrition, volume 49, pages 679–690 (1953)].

EXAMPLE 1

Freshly decorticated cottonseed meats were adjusted to a moisture content of 15% and flaked on spring-loaded smooth rolls to a thickness of 0.003". The flakes were then air-dried to a moisture content of 10.0% by weight. An equal weight of the A.H.W. mixture (consisting of 53 parts by volume of acetone, 44 parts by volume of commercial hexane and 3 parts by volume of water) was added to a portion of the flaked meats. While the resulting slurry was stirred gently, fresh solvent mixture was added slowly and continuously from the bottom of the container and oil-pigment-solvent miscella was allowed to overflow from the top. The solvent was recovered continuously from the miscella in a laboratory-size Struthers-Wells type evaporator and fed back to the bottom of the extraction chamber. This was continued until tests made on portions of the effluent showed that essentially all of the gossypol had been extracted from the flakes. The extracted flakes were then drained, air-dried, and ground into a meal. Results of analyses on the meal are shown in Table I.

*Table I*

Free gossypol (percent)_____ 0.00
Total gossypol (percent)_____ 0.40
Lysine (percent of protein)_____ 4.3
Soluble nitrogen (percent of total)_____ 92.0
Oil content (percent)_____ 0.1

Samples of solvent recovered from the miscella in the Struthers-Wells type evaporator were analyzed and found to consist of 53 parts by volume of acetone, 44 parts by volume of hexane and 3 parts by volume of water, the same composition as the original A.H.W. mixture used for the extraction of the flakes

EXAMPLE 2

An equal weight of the A.H.W. mixture was added to a portion of the flaked meats prepared as in Example 1. The mixture was stirred gently for 5 minutes, allowed to stand for 1 hour, stirred again as before, and then drained for 2 minutes on a 20 mesh screen. The screen and contents were then dipped into eight successive portions of fresh A.H.W. mixture, draining each time as before. The extracted flakes were air-dried and ground to 20 mesh particle size in a Wiley mill and then analyzed. The following results (Table II) were obtained.

*Table II*

Free gossypol (percent)_____ 0.02
Total gossypol (percent)_____ 0.25
Lysine (percent of protein)_____ 4.3
Soluble nitrogen (percent of total)_____ 94.0
Oil content (percent)_____ 0.4

EXAMPLE 3

A lot of cottonseed flakes was prepared as in Examples 1 and 2. However, the flakes were not dried, but were gently mixed immediately after flaking with an equal weight of the A.H.W. mixture. The slurry was allowed to stand for one hour in a closed container and then drained on a vibrating screen. The marc was resuspended with the same amount of fresh solvent eight more times and drained as before. After air-drying, a portion of the extracted flakes was ground to 20 mesh in a Wiley mill and analyzed with the following results.

*Table III*

Free gossypol (percent) _____ 0.04
Total gossypol (percent) _____ 0.4
Lysine (percent of protein) _____ 4.2
Soluble nitrogen (percent of total) _____ 92.0
Oil content (percent) _____ 0.6

The above examples show typical applications of the invention and suggest its adaptability to application in the equipment and extraction procedures presently used in commercial oil mills.

In Table IV are listed typical analyses of some commercial cottonseed meals produced at the present time for comparison with the analyses of the meals prepared as described in Examples 1, 2, and 3. These are given to illustrate the improved quality of meals prepared by the process of this invention and by use of the solvent specified in the invention.

*Table IV*

|  | Prepress Solvent Extracted C/S Meal | Unprocessed, Raw C/S Meats | Screw-press C/S Meal | Direct Solvent Extracted C/S Meal | Hydraulic Pressed C/S Meal |
|---|---|---|---|---|---|
| Free Gossypol (percent)_____ | 0.06 | 1.0 | 0.03 | 0.20 | 0.10 |
| Total Gossypol (percent)_____ | 1.3 | 1.0 | 1.3 | 1.0 | 1.2 |
| Lysine (percent of protein)_____ | 3.7 | 4.4 | 3.1 | 3.8 | 3.4 |
| Soluble Nitrogen (percent of total)_____ | 70.0 | 96.0 | 50.0 | 75.0 | 60.0 |
| Oil Content (percent)_____ | 1.0 | 33.0 | 1.0 | 0.8 | 5.0 |

As can be seen by comparison of the data in Table IV with that in Tables I, II, and III, the extracted meals prepared in accordance with the present invention have much higher soluble nitrogen and lysine contents, and much lower total gossypol content than the commercial cottonseed meals listed. The lysine and total gossypol contents of cottonseed meals are of special significance as nutritional factors in non-ruminant feeding; high lysine and low total gossypol levels are essential for optimum nutritional quality. Since the lysine levels are higher and total gossypol levels are lower than those encountered in commercially prepared cottonseed meals, the meals prepared with the A.H.W. mixture have greater nutritive quality. A comparison of the lysine data obtained on cottonseed meal prepared using the A.H.W. mixture with that obtained on untreated raw cottonseed flakes indicates that little, if any, damage to the natural protein results when the current invention is used in processing cottonseed. Furthermore, as shown by the examples of application of the invention, when suitable mechanical extraction methods are employed in conjunction with the A.H.W. solvent in the process of the present invention, it is possible to reduce the pigment content of cottonseed meal below the amount generally considered to cause egg discoloration when the meal is used in diets of laying hens.

We claim:

A process comprising adjusting the moisture content of raw decorticated cottonseed meats containing oil and undesirable pigments to from about 10 to about 15% at ambient temperature, flaking the moisture-adjusted meats to a thickness of from about 0.003 inch to about 0.010 inch, adjusting the moisture content of the flaked meats to from about 7 to about 15% at a temperature not to exceed about 130° F., extracting the oil and undesirable pigments from the so-adjusted flaked meats at ambient temperature with a homogeneous, constant boiling solvent mixture consisting of 53 parts by volume of acetone, 44 parts by volume of hexane, and 3 parts by volume of water, and desolventizing the extracted flaked meats at a temperature not to exceed about 150° F.

No references cited.